United States Patent [19]

Hiraiwa et al.

[11] Patent Number: 5,242,290
[45] Date of Patent: Sep. 7, 1993

[54] EXTRUSION FORMING APPARATUS

[75] Inventors: Takemi Hiraiwa, Kobe; Kazuhisa Kokui, Miki; Kunihei Inoue, Takasago, all of Japan

[73] Assignee: Nakata Zoki Co., Ltd, Japan

[21] Appl. No.: 959,464

[22] Filed: Oct. 9, 1992

Related U.S. Application Data

[63] Continuation of Ser. No. 787,908, Nov. 6, 1991, abandoned.

[30] Foreign Application Priority Data

Nov. 9, 1990 [JP] Japan .................. 2-305677

[51] Int. Cl.⁵ .................. B29C 47/06; B29C 47/12
[52] U.S. Cl. .................. 425/131.1; 156/244.11; 156/500; 264/171; 425/188; 425/382.3; 425/462
[58] Field of Search ........... 425/186, 188, 190, 192 R, 425/194, 131.1, 462, 191, 382.3, 133.5, 183, 461, 467; 156/244.11, 500; 264/171, 175

[56] References Cited

U.S. PATENT DOCUMENTS

| | | | |
|---|---|---|---|
| 3,151,356 | 10/1964 | Senecal | 425/462 |
| 3,902,835 | 9/1975 | Theysohn | 425/188 |
| 4,137,027 | 1/1979 | Ruger | 425/133.5 |
| 4,358,261 | 11/1982 | Ohki | 425/186 |
| 4,652,410 | 3/1987 | Inoue et al. | 425/186 |
| 4,683,095 | 7/1987 | Tolonen et al. | 425/131.1 |
| 4,824,353 | 4/1989 | Hirschkorn | 425/190 |
| 4,983,113 | 1/1991 | Hirschkorn | 425/183 |
| 5,061,166 | 10/1991 | Gohlisch et al. | 425/133.5 |

FOREIGN PATENT DOCUMENTS

| | | |
|---|---|---|
| 3212157 | 10/1983 | Fed. Rep. of Germany . |
| 3637731 | 5/1988 | Fed. Rep. of Germany . |
| 1-061221 | 3/1989 | Japan . |

Primary Examiner—Khanh P. Nguyen
Attorney, Agent, or Firm—Stevens, Davis, Miller & Mosher

[57] ABSTRACT

An extrusion forming apparatus (1) has an extruder (2) which has a head main body part (6) with an extruder main body (5A, 5B) and a pair of movable heads (7) coupled to the head main body part (6), and a clamping machine (3) which clamps the head main body part (6) and the movable heads (7). The head main body part (6) is provided with a first stopping piece (41) projecting on the side surface thereof and having a first stopping surface (43) extending obliquely backward toward the side surface of the head main body part (6). The movable head (7) is also provided with a second stopping piece (42) projecting on the side surface thereof and having a second stopping surface (44). The clamping machine (3) includes a pushing piece (53) having a contact surface (54) abutting against the second stopping surface (44), and a clamp piece (55) capable of moving in and out toward the side surface of the head main body part (6) and abutting against and pressing the first stopping surface (43) by moving toward the side surface of the head main body part (6).

2 Claims, 6 Drawing Sheets

EXTRUSION FORMING APPARATUS

This application is a continuation of application Ser. No. 07/787,908, filed Nov. 6, 1991 now abandoned.

BACKGROUND OF THE INVENTION

The present invention relates to an extrusion forming apparatus having clamping means in a simple structure.

Extruders for extruding rubber or other plastic materials and producing various formings such as sheets and pipes are widely used. In such extruders, for exchanging the nozzles to clean the passage of the plastic materials or changing the shape of extrusion, a movable head is disposed in the head main body part contiguous to the extruder main body, so that the head main body part and the movable head may be separated.

However, since a passage is formed between the head main body part and movable head, and a plastic material of high pressure passes through this passage, a strong separating force acts, and it is necessary to clamp the two very firmly.

In particular, as schematically shown in FIG. 1, where plural extruder main bodies 5A, 5B are provided, movable heads 7, 7 are attached to the upper and lower part of the head main body part 6, and the separating force is large, and hence it is required to seal the joint surfaces by firm clamping.

For such clamping, hitherto, a powerful hydraulic cylinder was used, or a toggle mechanism was employed.

Where a hydraulic cylinder is used, if a boosting mechanism is combined, the size of the hydraulic cylinder becomes large, and a hydraulic cylinder is needed on every movable head, thus the apparatus cost increases and the maintainability is impaired. On the other hand, where the toggle mechanism is used, the construction is complicated, and high precision linking is needed, and the manufacturing cost soars.

SUMMARY OF THE INVENTION

Accordingly, it is hence a primary object of the invention to present an extrusion forming apparatus simple is structure and capable of tightening securely.

According to one aspect of the present invention, an extrusion forming apparatus comprising an extruder (2) which has a head main body part (6) with at least one extruder main body (5A, 5B) mounted to the rear side (F) thereof and a pair of movable heads (7) coupled to the head main body part (6) and having a nozzle hole (37) communicating with the extruder main body (5A, 5B) at the front end thereof, and a clamping machine (3) which clamps the head main body part (6) and the movable heads (7). The head main body part (6) is provided with a pair of notch parts (22) each having a forward protruding surface (26) exposing a passage (24) communicating with the extruder main body (5A, 5B) and an inner surface (27) extending from the rear edge of the protruding surface (26). The movable heads (7) are disposed in the notch parts (22), and each has a covering surface (31) abutting against the protruding surface (26) for forming a path (35) communicating with the passage (24) and a rear surface (32) abutting against the inner surface (27). Further, the head main body part (6) is provided with a first stopping piece (41) projecting on the side surface thereof and having a first stopping surface (43) inclining backwardly toward the side surface of the head main body part (6). Each of the movable heads (7) is provided with a second stopping piece (42) projecting on the side surface thereof and having a second stopping surface (44) extending in a direction forming one side of a triangle together with the covering surface (31) and rear surface (32). The clamping machine (3) comprises a pushing piece (53) having a contact surface (54) abutting against the second stopping surface (44), and a clamp piece (55) capable of moving in and out toward the side surface of the head main body part (6) and abutting against and pressing the first stopping surface (43) of the first stopping piece (41) by moving toward the side surface of the head main body part (6).

As mentioned above, on the side surface of the head main body part of the extruder having the extruder main body attached to the back side, a first stopping piece having the rear end as a slope is disposed, and on the side surface of the movable head, a second stopping piece is disposed. The clamping machine has a pushing piece with a contact surface abutting against the second stopping piece, and a clamp piece for pressing the first stopping piece in the contact state.

The second stopping piece and the pushing piece contact with each other, and the first stopping piece and the clamp piece are engaged with each other in a wedge form to press, so that the movable head is brought closer to the head main body part to press and clamp the joint surfaces, thereby preventing leakage of the plastic material. Besides, the second stopping surface contacting with the pushing piece of the second stopping piece forms a side of a triangle together with the covering surface and rear surface which are joint surfaces with the head main body part, so that the clamping force will achieve contact of the joint surface more efficiently by its partial force.

BRIEF DESCRIPTION OF THE DRAWINGS

An embodiment of the present invention will now be described by way of example, referring the attached drawings, in which;

FIGS. 1 to 7 represent an embodiment in which the extrusion forming apparatus 1 of the invention is employed as a rubber extrusion forming apparatus for rubber extrusion.

DETAILED DESCRIPTION OF A PREFERRED EMBODIMENT

The extrusion forming apparatus 1 comprises an extruder 2 and a clamping machine 3, and the clamping machine 3 is provided with a thickness adjusting device 9 with rolls for adjusting the thickness of a sheet S being extruded from the extruder 2.

Figure 1:
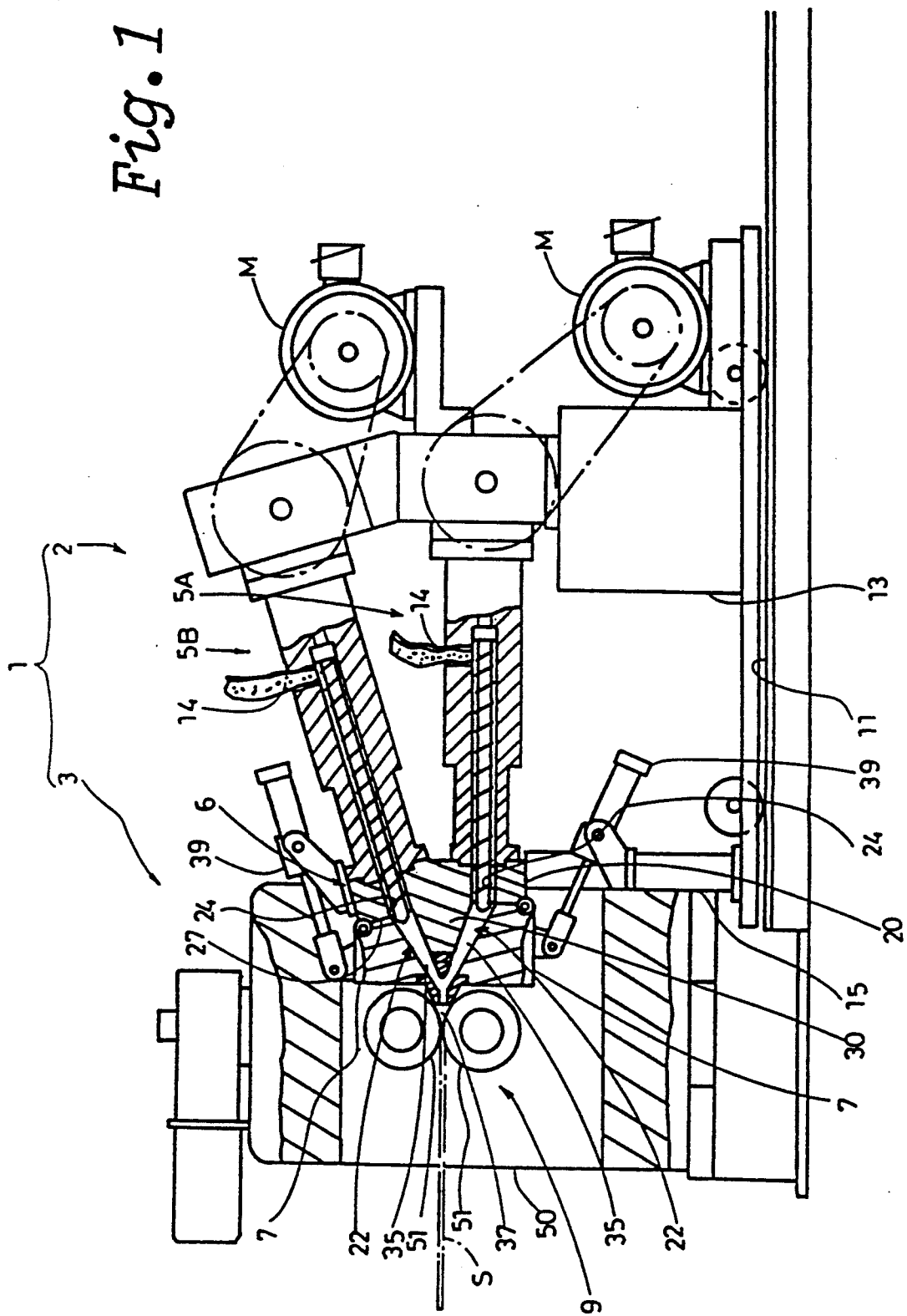
FIG. 1 is a sectional view showing an embodiment of the invention.

As shown in FIG. 1, the extruder 2 is mounted on a carriage moving back and fourth on a rail 11 extending from the clamping machine 3. The extruder 2 comprises an extruder main body 5A disposed horizontally on a support base 13, and an extruder main body 5B disposed above it. The extruder 2 is formed as a picker back type rubber extrusion apparatus for extruding in a sheet form, in this embodiment, by laminating different rubber materials.

Figure 6:
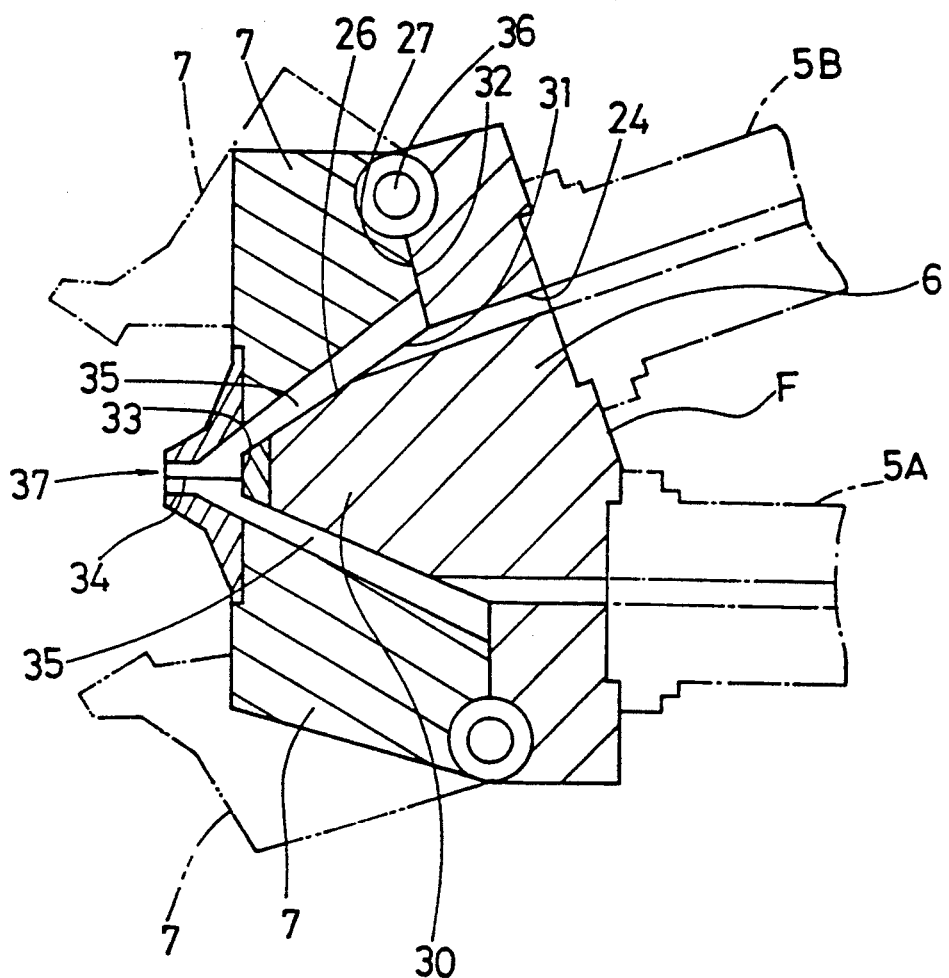
FIG. 6 is a sectional view showing a head main body part and movable heads.
Figure 7:
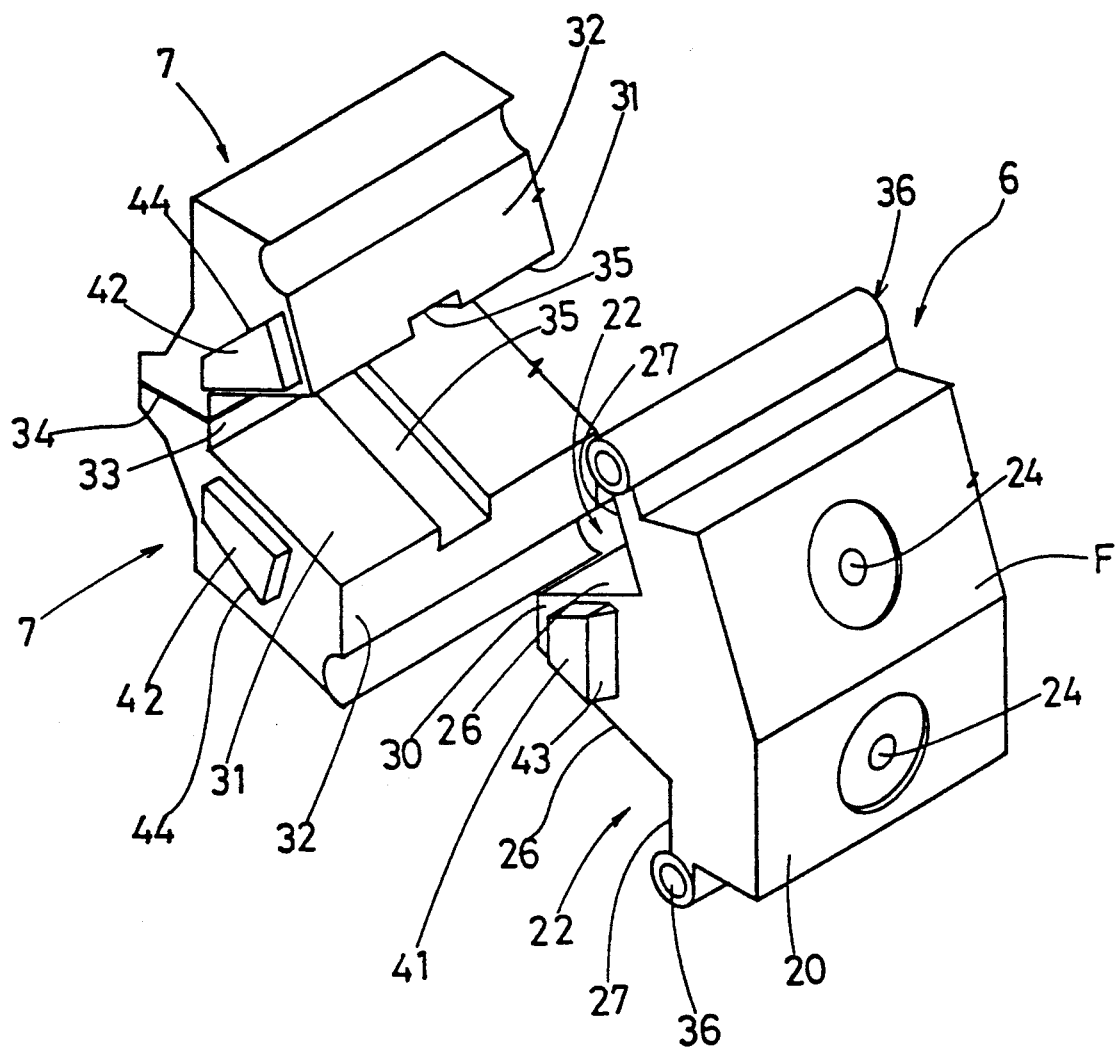
FIG. 7 is an exploded view showing a head main body part and movable heads.

The extruder main bodies 5A, 5B, as shown in FIG. 6, 7, intersect obliquely at an acute angle, and their front ends are coupled with bolts to the rear surface F bent in a V-form of the head main body part 6. Meanwhile, the extruder main bodies 5A, 5B have the known constitution for kneading and fusing the rubber charged from an inlet 14 by means of a screw shaft driven by a motor M through an orthogonal reduction gear.

The head main body part 6 is supported on the carriage through support bases 15, and has a base part 20 made of a slender block for forming sheets. The base part 20 has upper and lower notches 22, 22 in an L-form having its front upper and lower parts cut off.

By these notches 22, 22, the base part 20 of the head main body part 6 is provided with a protruding surface 26 for exposing passages 24, 24 communicating with the rubber exit of the extruder main bodies 5A, 5B, and an inner surface 27 crossing at an obtuse angle of 90 degrees or over 90 degrees with the protruding surface 26 from the rear edge of the protruding surface 26. As the upper and lower protruding surfaces 26, 26 approach toward the forward side, the base part 20 has a tapered nose part 30 protecting forward.

Figure 2:
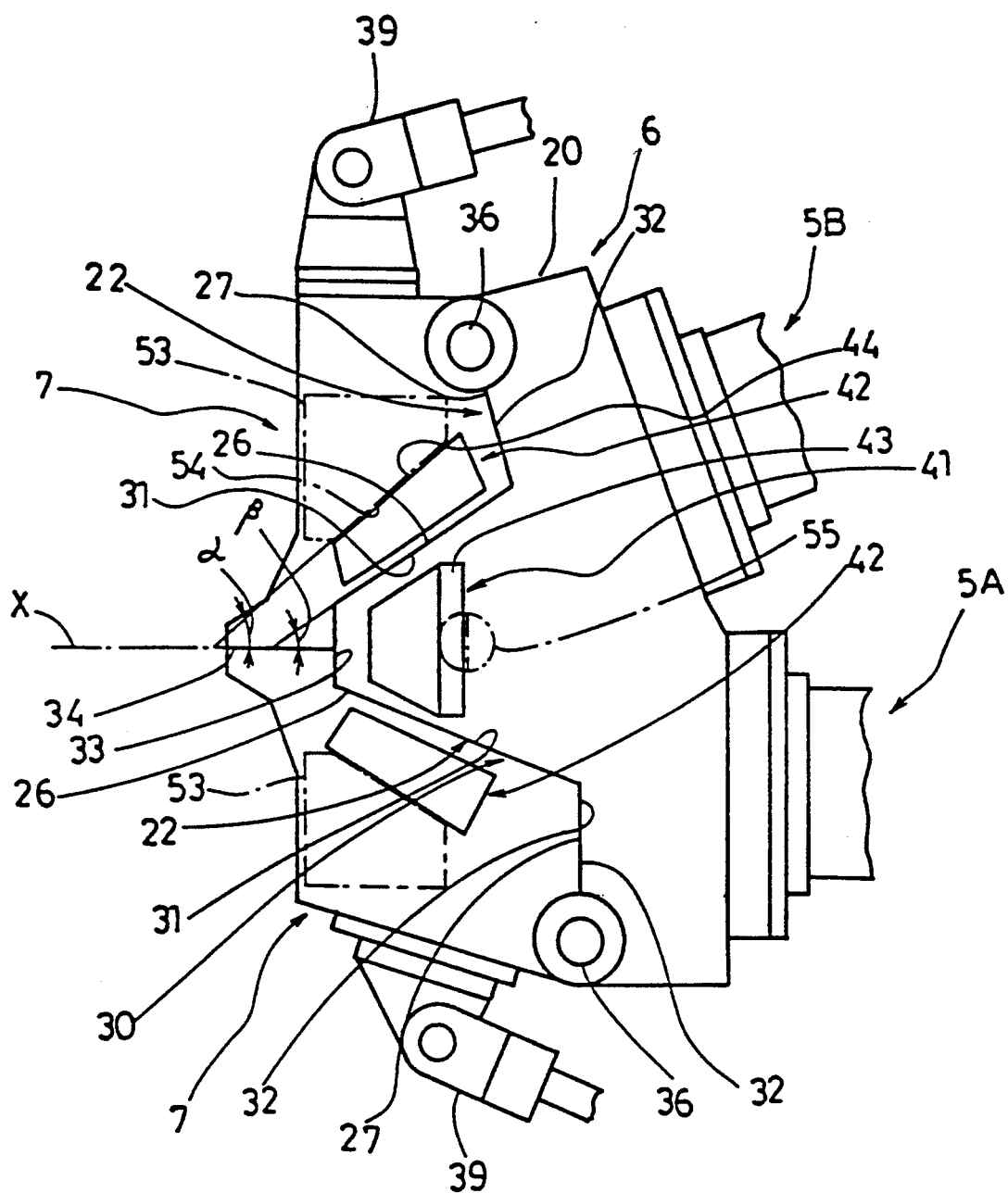
FIG. 2 is a front elevational view schematically showing first and second stopping pieces, pushing piece and clamp piece.
Figure 3:
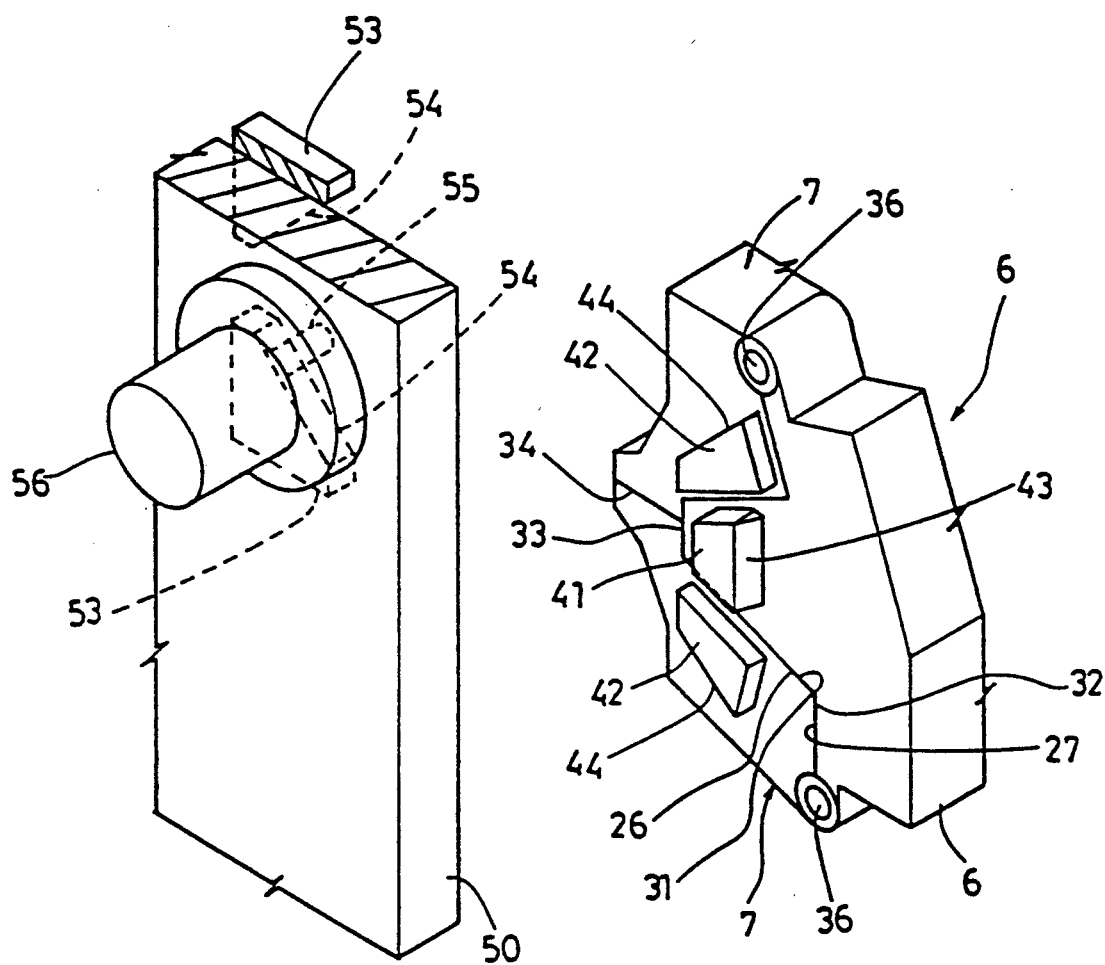
FIG. 3 is a perspective view thereof.

The upper and lower notches 22, 22 are provided with upper and lower movable heads 7, 7. The movable head 7 comprises, as schematically shown in FIGS. 2, 3, a covering surface 31 abutting against the protruding surface 26, and a rear surface 32 abutting the inner surface 27, and also form, in this embodiment, a contact surface 33 abutting against the front face of the nose part 30, and a sectional surface 34 contacting with the upper and lower movable heads 7, 7. The protruding surface 26 and/or covering surface 31 has a proper groove disposed in the middle part in the widthwise direction, and forms a path 35 communicating with the passage 24 as shown in FIG. 1. The upper and lower movable heads 7, 7 form a nozzle opening 37 at the front end through the converging part of the path 35. The nozzle opening 37 may be formed by using a nozzle fitting which is detachably fitted to the movable head.

The movable heads 7, 7 are pivoted by pivoting parts 36, 36 at the upper and lower ends of the base part 20, and are rotated by the upper and lower cylinders 39, thereby opening the notches 22, 22.

The head main body part 6 has a first stopping piece 41 provided on its side surface. The movable heads 7 has second stopping pieces 42, 42 provided on their surfaces.

The first stopping piece 41 is composed of a trapezoidal plate projecting from the side of the nose part 30, and the rear end behind the center line of the head main body part 6 forms a first stopping surface 43 composed of a slope inclined backward toward the side surface. The second stopping pieces 42, 42 are made of plates projecting from the side of the, movable head 7, and the side remote from the covering surface 31 forms a second stopping surface 44 of a side forming a triangle together with the covering surface 31 and the rear surface 32. Therefore, the angle $\alpha$ formed by the second stopping surface 44 and the axial line X is greater than the angle $\beta$ formed by the covering surface 31 and the axial line X.

The clamping machine 3 has a portal frame standing between a pair of side plates 50, 50 set up on the floor with a base by way of a proper linkage plate, and has the thickness adjusting device 9 with upper and lower rolls 51, 51 disposed between the side plates 50, 50. Inside of the plates 50 and ahead of the rolls 51, there are upper and lower pushing pieces 53, 53 having contact surfaces 54, 54 abutting against the second stopping surfaces 44, 44 of the upper and lower second stopping pieces 42, 42. The contact surfaces 54, 54 are inclined at the same angle as the angle $\alpha$ of the second stopping surfaces 44.

Figure 4:
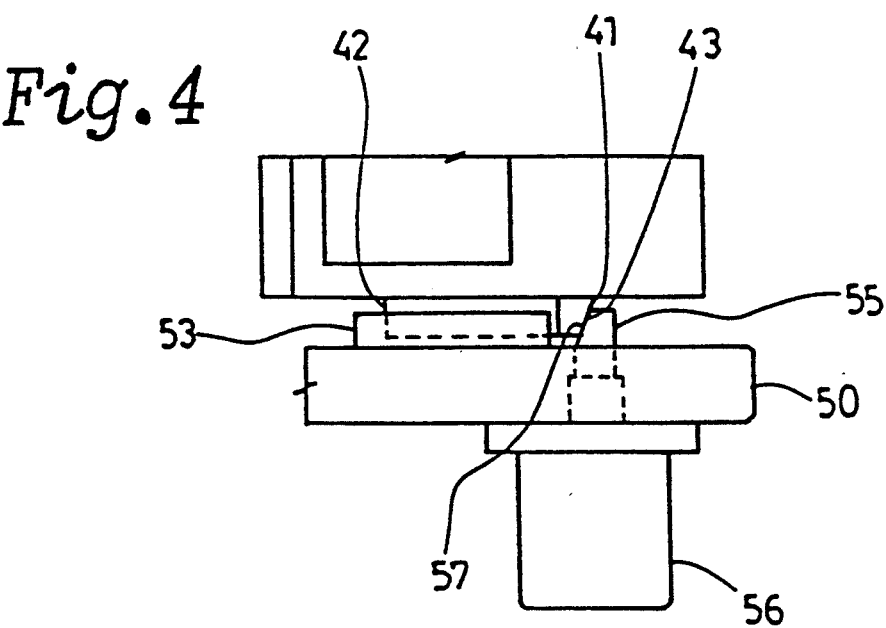
FIG. 4 is a partial plan view showing its action.

The side plate 50 is provided with a cylinder or other pushing tool 56 having a clamp piece 55 for abutting and pressing against the first stopping surface 43 of the first stopping piece 41 by moving in and out toward the head main body part 6, in the state of the contact surface 54 abutting against the second stopping surface 44. Meanwhile, the clamp piece 55 has a slope, cutting off at the same angle as the first stopping surface 43, as schematically shown in FIG. 4. Therefore, as the clamp piece 55 moves out, the movable head 7 held by the contact surface 54 and the head main body part 6 pressed by the clamp piece 55 are clamped in the approaching direction. Consequently, the protruding surface 26 and covering surface 31, the inner surface 27 and rear surface 32 are mutually in contact with each other, thereby preventing leakage of rubber. At the same time, the contact surface 33 and sectional surface 34 are brought to a tight contact.

The second stopping surface 44 forms a side of a triangle inclined to the covering surface 31 together with the rear surface 32, and hence the force in the axial line X acting on the first stopping surface 43 exerts partial forces on the covering surface 31 and rear surface 32, so that both surfaces may be brought to a tight contact.

The clamp piece 55 moves backward, and then the extruder 2 moves on the rail 11 so as to be separated from the clamping machine 3. As a result, it is unclamped, and the cylinder 39 is contracted, and the movable heads 7, 7 are opened, thereby enabling access for replacing the nozzles or cleaning the passage. Afterwards, the extruder 2 is moved forward, and clamped by the clamping machine 3 as mentioned above.

Figure 5:
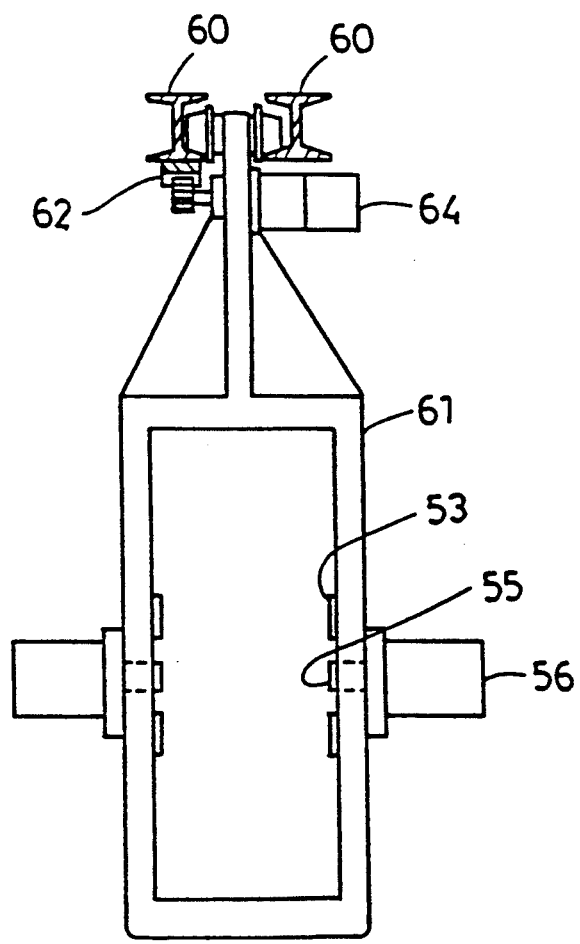
FIG. 5 is a front view showing another example of a clamping machine.

In the apparatus of the invention, while fixing the extruder 2 on the floor, the clamping machine 3 may be movable. At this time, the clamping machine 3 may run on the rail installed on the floor, or a pressing tool 56 having a clamp piece 55 and the pushing piece 53 may be disposed on a rectangular frame 61 movably mounted on the rails 60, 60 straddling above as shown in FIG. 5. In this case, the apparatus of the invention may be modified in various ways, such as automatic running by means of a reduction motor 64 having pinions to be engaged with a rack 62 disposed in the lower surface of the rail 60.

As previously described, the extrusion forming apparatus of the invention is simple in constitution in which the first stopping piece is disposed in the head main body part and the second piece in the movable head, and the clamping machine is provided with a pushing piece and clamp a piece, and is capable of clamping firmly by making use of wedge action, reducing the weight and saving the space, and also saving the cost by producing by simple processing, and is also excellent in maintainability.

We claim:

1. An extrusion forming apparatus comprising an extruder having
    two extruder main bodies for extruding resin from an exit of each extruder main body and arranged at an acute angle to each other,
    said exits being mounted to a head main body part which has two passages extending downstream from said exits,
    a pair of movable heads coupled to the head main body part defining a nozzle hole communicating with passages at a downstream end of the pair of movable heads,
    a clamping means which sealingly clamps the head main body part and the movable heads in a manner to preclude resin leakage;
    said head main body part having a pair of V-notches for positioning the movable heads, each of the V-notches being surrounded by a protruding surface which is inclined toward a nozzle hole so as to communicate one of the passages with an inner surface extending from an edge of the upstream direction of the protruding surface;
    each of said movable heads being rotatably mounted at an end of the inner surface and having a covering surface abutting against the protruding surface and a rear surface abutting against the inner surface, said protruding and covering surfaces forming a path connecting at least one of the passages to said nozzle hole between the covering surface and the protruding surface, and positioned to define said path by its rotational moving from the V-notch; wherein
    said head main body part includes a first stopping piece projecting on a side surface thereof and having a first stopping surface inclined backwardly toward a side surface of the head main body part;
    each of said movable heads including a second stopping piece projecting on a side surface thereof and a second stopping surface extending in a direction to form one side of a triangle which is formed with said covering surface and said rear surface;
    said clamping means comprising
    a pair of retaining pieces each having a contact surface for abutting against the second stopping surface for retaining the movable head, and a clamp piece capable of moving forwardly and backwardly toward and away from the side surface of the head main body part, said moving being between a clamping position in which the clamp piece pushes the first stopping surface by forwardly moving so as to force the main body part toward a downstream direction, thereby pressing the covering surface of the movable heads and the protruding surface of the main body part in a manner to preclude resin leakage, and an unclamping position in which the clamp piece releases the first stopping surface when moved in said backward direction.

2. An extrusion forming apparatus comprising an extruder having at least one extruder main body for extruding resin from an exit of said at least one extruder main body,
    said exit being mounted to a head main body part which has a passage extending downstream from said exit,
    a pair of movable heads coupled to the head main body part defining a nozzle hole communicating with a passage downstream of the pair of movable heads
    a clamping means which sealingly clamps the head main body part and the movable heads in a manner to preclude resin leakage;
    said head main body part having a pair of V-notches for positioning the movable heads, each of the V-notches being surrounded by a protruding surface which is inclined toward a nozzle hole and an upstanding surface extending from an edge of the upstream direction of the protruding surface,
    each of said movable heads being rotatably mounted at an end of the upstanding surface and having a covering surface abutting against the protruding surface and a rear surface abutting against the upstanding surface, and one of the movable heads forming a path connecting the passage to said nozzle hole between the covering surface and the protruding surface and positioned to define said path by its rotational moving from the V-notch; wherein
    said head main body part includes a first stopping piece projecting on a side surface thereof and having a first stopping surface inclined backwardly toward a side surface of the head main body part;
    each of said movable heads including a second stopping piece projecting on a side surface thereof and a second stopping surface extending in a direction to form one side of a triangle which is formed with said covering surface and said rear surface;
    said clamping means comprising
    a pair of retaining pieces each having a contact surface for abutting against the second stopping surface for retaining the movable head, and
    a clamp piece capable of moving forwardly and backwardly toward and away from the side surface of the head main body part, said moving being between a clamping position in which the clamp piece pushes the first stopping surface by forwardly moving so as to force the main body part toward a downstream direction, thereby pressing the covering surface of the movable heads and the protruding surface of the main body part in a manner to preclude resin leakage, and an unclamping position in which the clamp piece releases the first stopping surface when moved in said backward direction.

* * * * *